No. 650,847. Patented June 5, 1900.
H. W. LIBBEY.
AUTOMOBILE DELIVERY WAGON.
(Application filed Oct. 2, 1899.)
(No Model.)
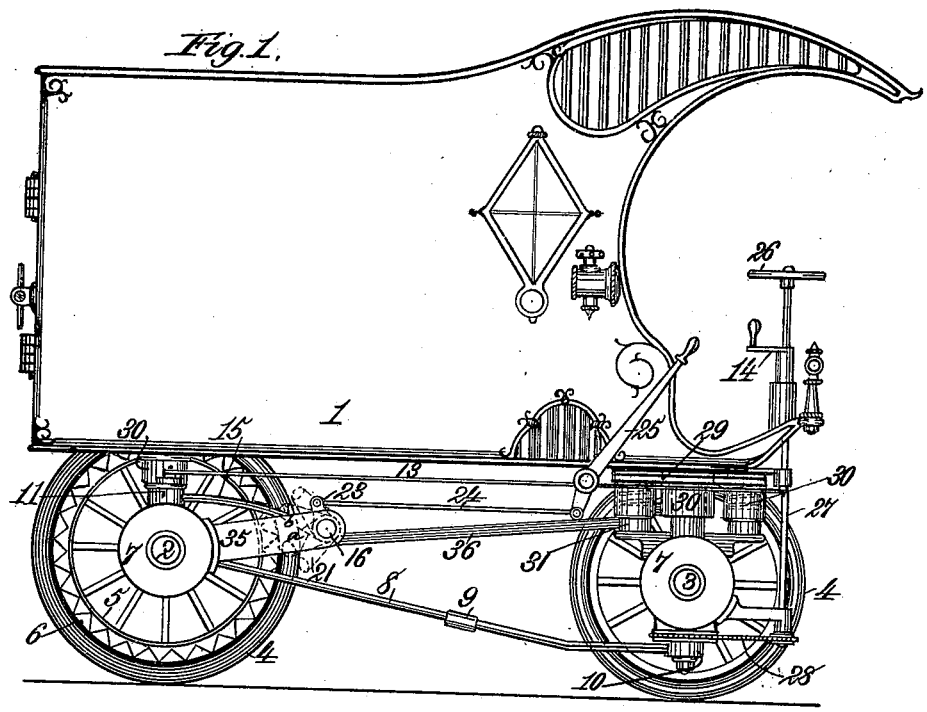
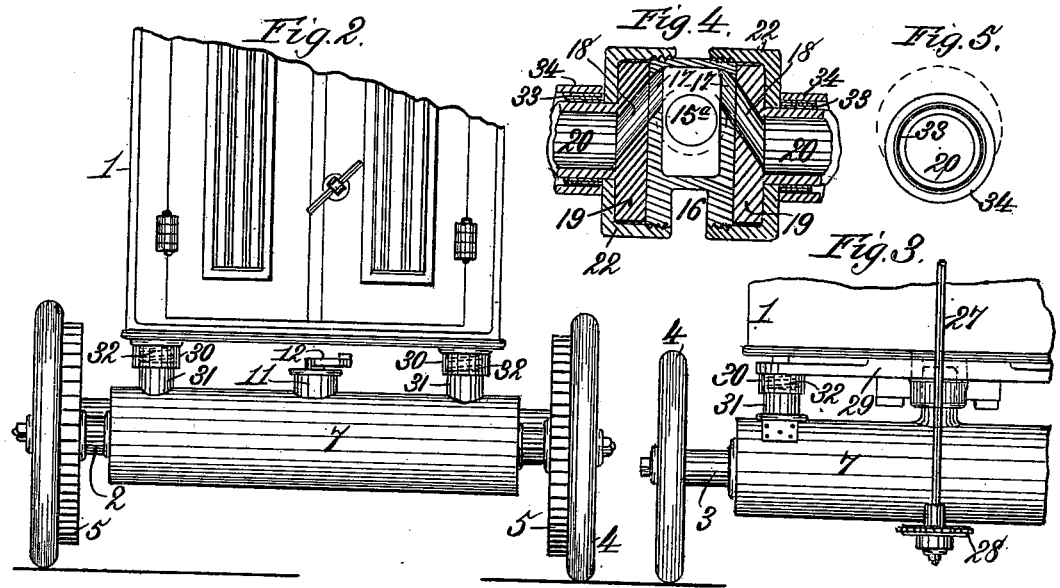
WITNESSES:
INVENTOR.
Hosea W. Libbey.
BY James L. Norris
ATTORNEY.

UNITED STATES PATENT OFFICE.

HOSEA W. LIBBEY, OF BOSTON, MASSACHUSETTS.

AUTOMOBILE DELIVERY-WAGON.

SPECIFICATION forming part of Letters Patent No. 650,847, dated June 5, 1900.

Application filed October 2, 1899. Serial No. 732,403. (No model.)

*To all whom it may concern:*

Be it known that I, HOSEA W. LIBBEY, a citizen of the United States, residing at Boston, in the county of Suffolk and State of Massachusetts, have invented new and useful Improvements in Automobile Delivery-Wagons, of which the following is a specification.

This invention relates to automobile delivery-wagons to be propelled by the pressure of compressed or liquefied air or gas discharged against the buckets, vanes, or blades of motor-wheels attached, preferably, to the rear traction-wheels of the vehicle.

The invention consists in features of construction and novel combinations of parts in an automobile wagon to be propelled by the force of expanding, compressed, or liquefied air or gas, as hereinafter described and claimed.

In the annexed drawings, Figure 1 is a side elevation of an automobile delivery-wagon constructed and operated according to my invention. Fig. 2 is a partial rear elevation of the same. Fig. 3 is a partial front view of the same. Fig. 4 is a sectional view of a distributing-chamber through which the discharge of the compressed or liquefied air or gas is controlled. Fig. 5 is a view of a portion of the distributing-chamber, showing non-conducting coverings for the exit-pipes.

In Figs. 1, 2, and 3 the reference-numeral 1 designates the closed-in body portion of a delivery-wagon for the transportation of goods or merchandise. This wagon-body is supported on running-gear comprising a rear axle 2 and a swiveling front axle 3, each of which axles is provided with traction-wheels 4, that are preferably provided with pneumatic tires.

To the inner sides of the two rear traction-wheels are secured motor-wheels 5, each having its periphery constructed or provided with buckets 6, having symmetrical sides, as shown in Fig. 1.

The storage-reservoirs 7 for the compressed or liquefied air or gas are cylindrical in form and are located rigidly around the front and rear axles, respectively, and form substantially a part of the same, as shown. These two storage-reservoirs are connected by an equalizing-pipe 8, that is extended from a central under portion of the forward reservoir to a central front portion of the rear reservoir, as shown in Fig. 1. Any suitable flexible sliding connection 9, Fig. 1, may be arranged in this pipe, as shown. To provide for swiveling of the front axle without subjecting the equalizing-pipe 8 to strain or torsion, the forward end of said pipe connects by a sleeve 10, Fig. 1, with the passage that leads downward from the lower central portion of the forward reservoir.

On the central upper portion of the rear storage-reservoir 7 and communicating therewith there is located a reducing-valve 11, Figs. 1 and 2, of any suitable construction. This reducing-valve 11 is connected by a crank-arm 12, Fig. 2, and a forwardly-extended rod 13, Fig. 1, with the lower end of a vertically-arranged cranked shaft 14, Fig. 1, through which the reducing-valve 11 can be operated, as required.

The reducing-valve 11 communicates through a pipe 15, Fig. 1, with a distributing-chamber 16, Figs. 1 and 4, through which the discharge of compressed or liquefied air or gas is controlled to propel the vehicle forward or rearward and to apply braking action to the motor-wheels, as required. This distributing-chamber 16 has a port 15<sup>a</sup>, through which it communicates with the pipe 15, and it is also provided on opposite sides with ports 17, adapted to communicate with ports 18 in flanges 19, Fig. 4, on the inner ends of laterally-extended pipes 20, each of which has a nozzle 21 attached to its outer end. The two sides or ends of the distributing-chamber 16 are provided with flanged caps 22, Fig. 4, by which the flanged ends 19 of the pipes 20 are attached to the distributing-chamber in such manner as to permit the pipes 20 to be rocked. Each rocking pipe 20 is provided with a rigid arm 23, Fig. 1, for attachment of a connecting-rod 24, the forward end of which connects with the lower arm of a lever 25, fulcrumed at one side of the wagon within easy reach of the driver or motorman. There are two of these levers 25 located side by side, and each has its lower arm connected by a rod, as 24, to an arm, as 23, on one of the outlet-pipes 20 from the distributing-chamber. Thus the nozzles 21, attached to these pipes 20, can be operated independently through the appropriate lever 25; but the two levers 25 are located so close together that both can be grasped at once to operate both nozzles together, if desired.

It will be observed that by means of the levers 25 the nozzles 21 can be swung to such position, as indicated by a, Fig. 1, to deliver a blast of air downward and rearward against the buckets 6 of the motor-wheels 5 in such manner as to propel the vehicle forward; also, by means of the levers 25 the nozzles 21 can be swung to the position shown by dotted lines at b, Fig. 1, to deliver a blast of air upward and rearward against the buckets of the motor-wheels in such manner as to exert a braking action or to propel the vehicle rearward, as required. In turning corners the speed of the two wheels may be varied by swinging one of the nozzles downward and the other upward. By throwing the lever 25 farther in either direction the nozzles may be thrown to the extreme outward positions, (shown in Fig. 1,) thereby carrying the ports 18, Fig. 4, away from the ports 17, and consequently cutting off the air-blast entirely.

The steering of the vehicle is accomplished through a hand-wheel 26, Fig. 1, on the upper end of a vertical shaft 27, the lower end of which carries a sprocket-wheel connected by a chain 28 with a sprocket-wheel beneath the central portion of the forward axle.

Above the forward axle and supporting the front end of the wagon-body there is a fifth-wheel or swiveling bolster 29, arranged to permit swiveling of the front axle in turning or steering the vehicle. Between the forward axle and the fifth-wheel and also between the rear axle and the body of the vehicle there is an arrangement of cylinders 30 and pistons 31, with compression-springs 32 inclosed in the several cylinders between the pistons and the cylinder-heads to provide the required elastic support for the vehicle-body and obviate jars and strains.

It is preferable to provide the reservoirs and also the several pipes or passages for the compressed liquefied air or gas with non-conducting coverings that may consist of an inner layer of asbestos 33 and an outer covering of rubber 34, as indicated in Fig. 5, which shows this non-conducting covering as applied to one of the outlets of the distributing-chamber.

By providing a motor-wheel on each of the two rear traction-wheels to be operated by the two independently-swinging nozzles 21, as described, the vehicle can be readily controlled either for propelling it forward or for backing when required, and also by this construction braking action can be employed whenever necessary. The two levers 25 for controlling the swinging nozzles, the cranked shaft 14 for operating the reducing-valve, and the hand-wheel 26 for steering the vehicle are all located within easy reach of the driver.

The distributing-chamber 16 and its connected swinging nozzles 21 may be supported from the forward end of a bracket 35, Fig. 1, or in any other suitable manner, and a reach 36, Fig. 1, will be provided, as usual, between the front and rear axles or connected parts.

If desired, the storage-reservoir and the several pipes and passages for compressed or liquefied air or gas may be provided with a non-conducting covering, preferably composed of an inner layer of asbestos and an outer layer of rubber or rubber fabric, the asbestos being designed to protect the contents of said reservoirs and passages from the warmth of the outside atmosphere and the rubber to afford a protection against dampness.

What I claim as my invention is—

1. In an automobile vehicle, to be propelled by the expanding force of compressed or liquefied air or gas, the combination of motor-wheels located on the rear traction-wheels and provided with buckets, a reservoir for compressed or liquefied air or gas, a reducing-valve communicating with said reservoir, a distributing-chamber communicating with the reducing-valve and provided with ports in its opposite ends, rocking pipes having flanged inner ends provided with ports to register with the ports of the distributing-chamber, nozzles on the outer ends of said pipes, lever mechanism for swinging said nozzles and their attached pipes independently or together to direct blasts against the motor-wheels, and lever mechanism for the reducing-valve, substantially as described.

2. In an automobile vehicle, to be propelled by compressed or liquefied air or gas, the combination of motor-wheels attached to the rear traction-wheels and provided with vanes or buckets, storage-reservoirs for compressed or liquefied air or gas located around the front and rear axles of the vehicle, an equalizing-pipe extended from the central lower portion of the forward reservoir to the central front portion of the rear reservoir, an equalizing-valve located on and communicating with the rear reservoir, lever mechanism for operating said valve, a distributing-chamber communicating with the reducing-valve, rocking pipes extended laterally from the distributing-chamber and adapted to communicate therewith, swinging nozzles on the ends of said pipes, and lever mechanism for swinging said nozzles and pipes independently or together, substantially as described.

3. In an automobile vehicle, to be propelled by compressed or liquefied air or gas, the combination of motor-wheels attached to the rear traction-wheels, reservoirs for air or gas located around the front and rear axles of the vehicle, an equalizing-pipe connecting said reservoirs, a reducing-valve located on and communicating with the rear reservoir, lever mechanism for operating said valve, a distributing-chamber communicating with the reducing-valve, swinging nozzles adapted to communicate with said distributing-chamber to discharge blasts against the motor-wheels, lever mechanism for swinging said nozzles independently or together, and elastic devices intermediate the axles and the body of the vehicle and comprising cylinders, pistons and compression-springs, substantially as described.

In testimony whereof I have hereunto set my hand in presence of two subscribing witnesses.

HOSEA W. LIBBEY.

Witnesses:
CHAS. STEERE,
WINIFRED G. KERWIN.